US012610960B1

(12) United States Patent
Zaid

(10) Patent No.: US 12,610,960 B1
(45) Date of Patent: Apr. 28, 2026

(54) METHOD FOR EXTENDING THE SHELF LIFE OF RUTAB STAGE DATE PALM FRUIT

(71) Applicant: KING FAISAL UNIVERSITY, Al-Ahsa (SA)

(72) Inventor: Zaid Abdulhamid Zaid Albin Zaid, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 19/423,342

(22) Filed: Dec. 17, 2025

(51) Int. Cl.
| | |
|---|---|
| *A23B 7/153* | (2006.01) |
| *A23B 2/40* | (2025.01) |
| *A23B 7/00* | (2006.01) |
| *A23B 7/14* | (2006.01) |
| *A23B 9/14* | (2006.01) |

(52) U.S. Cl.
CPC ................ *A23B 7/153* (2013.01); *A23B 2/40* (2025.01); *A23B 7/00* (2013.01); *A23B 7/14* (2013.01); *A23B 9/14* (2013.01)

(58) Field of Classification Search
CPC .... A23B 2/00; A23B 2/40; A23B 7/00; A23B 7/14; A23B 9/14
See application file for complete search history.

(56) References Cited

U.S. PATENT DOCUMENTS

2019/0104748 A1* 4/2019 Kaun ..................... A23B 7/154

FOREIGN PATENT DOCUMENTS

| | | |
|---|---|---|
| EP | 4154730 A1 | 3/2023 |
| EP | 4154734 A1 | 3/2023 |

OTHER PUBLICATIONS

Taain, D. A., "The Role of Some Plant Extracts and Storage Temperature in Improving Storage Ability of Date Palm Fruits cv. Dayri (*Phoenix dactylifera* L. cv. Dayri )", AAB Bioflux (6)1: pp. 26-32 Jan. 2014.

Al-Awa, Z.F.A., et al., "Effect of Leaf Powdering Technique On the Characteristics of Date Palm-Derived Cellulose"; ACS Omega 8: pp. 18930-18939 (2023).

Mostafa, H., et al., "Structural, Mechanical, Antioxidant and Anti-bacterial Properties of Soy Protein Isolate (SPI)-Based Edible Food Packaging Films as Influenced By Nanocellulose (NC) and Green Extracted Phenolic Compounds From Date Palm Leaves"; Food Packaging and Shelf Life, 38:101124 (2023).

* cited by examiner

*Primary Examiner* — Nikki H. Dees
*Assistant Examiner* — Joseph Cullen Merchlinsky
(74) *Attorney, Agent, or Firm* — Nath, Goldberg & Meyer; Joshua B. Goldberg

(57) ABSTRACT

A method for extending the rutab stage date palm fruit. The method can include obtaining leaves from a date palm tree, obtaining date fruit at rutab stage, drying the leaves to obtain dried date palm leaves, reducing the dried date palm leaves to a powder, and covering the rutab stage date fruit with the powder to obtain a powder-covered date fruit. In an embodiment, the powder can be disposed in a container and the rutab stage date fruit can be immersed in the powder within the container.

18 Claims, No Drawings

METHOD FOR EXTENDING THE SHELF LIFE OF RUTAB STAGE DATE PALM FRUIT

FIELD

The present disclosure relates to food preservation and, particularly, to a method for extending the shelf life of rutab-stage date palm fruit.

DESCRIPTION OF THE RELATED ART

In Saudi Arabia, the date palm fruit is an important food source and element of the nation economy. These majestic trees have sustained and nurtured communities for millennia with their nutrient-rich fruit. Date fruit ripening is a complicated process including chlorophyll degradation, carotenoid synthesis, cell wall degradation, and conversion of starch to sugars. During formation and ripening, date fruit goes through the main fruit-able stages named khalal (hardening), rutab (softening), and tamer (ripened).

While date fruit in the rutab stage is more expensive than dates at other date stages, the rutab stage dates have a short shelf life of about 2-3 days. As such, marketing, storage, and transportation of date fruit in the rutab stage is challenging. This prized stage boasts a unique yellowish color, texture, and taste, but these qualities unfortunately vanish quickly, with the fruit transitioning to a reddish hue and losing its distinctive character. According to literature, this is mainly due to (1) excessive moisture loss during storage which leads to wrinkling and darkening of the date skin; (2) oxidation, as exposure to air can cause enzymatic browning in dates, resulting in a gradual color change from yellowish to a deeper reddish-black shade; and (3) bacterial or fungal growth which causes blackening of dates and can also indicate spoilage or fungal infection, requiring discarding the dates for safety reasons.

Thus, a method for extending the rutab stage date palm fruit solving the afore-mentioned problems is desired.

SUMMARY

The present disclosure relates to a method for extending the rutab stage date palm fruit. The method can include obtaining leaves from a date palm tree, obtaining date fruit at rutab stage, drying the leaves to obtain dried date palm leaves, reducing the dried date palm leaves to a powder, and covering the rutab stage date fruit with the powder to obtain a powder-covered date fruit. In an embodiment, the powder can be disposed in a container and the rutab stage date fruit can be immersed in the powder within the container. When stored in this manner, the shelf life of the rutab-stage date fruit or the rutab stage of the date fruit can be extended. For example, the rutab stage of the date fruit can be extended for about six to about eight days. It is believed that the leaf powder, as described herein, has antioxidant, antibacterial, and moisture retentive properties that help to preserve the date fruit and retain moisture.

According to an embodiment, a method for extending the rutab stage of date palm fruit can include obtaining leaves from a date palm tree, obtaining date fruit at a rutab stage, drying the leaves in an oven at a temperature ranging from about 90° C. to about 110° C. for a period of time to obtain dried date palm leaves, reducing the dried date palm leaves to a powder, covering the rutab stage date fruit with the powder to obtain a powder-covered date fruit, and storing the powder covered date fruit.

According to an embodiment, a method for extending the rutab stage of date palm fruit can include obtaining leaves from a date palm tree, obtaining date palm fruit at a rutab stage, drying the leaves in an oven at a temperature ranging from about 90° C. to about 110° C. for about 12 hours to about 36 hours to obtain dried date palm leaves, reducing the dried date palm leaves to a powder, and covering the rutab-stage date fruits with the powder. In an embodiment, the powder can be disposed in a container and the rutab-stage date fruit can be immersed in the powder within the container.

These and other features of the present disclosure will become readily apparent upon further review of the following specification.

DETAILED DESCRIPTION OF THE PREFERRED EMBODIMENTS

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method for extending the rutab stage of date fruit. The method can include obtaining leaves from a date palm tree, drying the leaves to obtain dried date palm leaves, reducing the dried date palm leaves to a powder, and covering the date fruit with the powder. In an embodiment, the date fruit has reached the rutab stage, also referred to, herein, as rutab-stage date fruit. In an embodiment, the powder can be disposed in a container and the rutab-stage date fruit can be immersed in the powder within the container. When stored in this manner, the shelf life of the rutab-stage date fruit or the rutab stage of the date fruit can be extended. The leaf powder, as described herein, has antioxidant, antibacterial, and moisture retentive properties that help to preserve the date fruit and retain moisture.

Extending the rutab stage of date fruit is critical for fulfilling specific market demands while preserving their characteristic texture, color, and taste. The present method extends the rutab stage of the date fruit in a manner that is environmentally sustainable, easy, re-useable, and at minimal cost.

In an embodiment, the date palm leaves can be dried at a temperature ranging from about 90° C. to about 110° C. for a period of time. The drying can be performed in a conventional manner, for example, using a conventional oven. In an embodiment, the date palm leaves can be dried at a temperature of about 100° C. In an embodiment, the period of time can range from about 12 hours to about 36 hours. In an embodiment, the period of time can be about 24 hours.

In an embodiment, the dried date palm leaves can be reduced to a powder. In an embodiment, the dried date palm leaves can be pulverized or shredded to a powder form. In an embodiment, the powder includes powder particles having a size ranging from about 300 micrometers to about 700 micrometers. In an embodiment, the powder includes powder particles having a size of about 500 micrometers.

The date fruit can be stored in a container including the date palm leaf powder. In an embodiment, the date fruit is partially or completely covered with the date palm leaf powder. In an embodiment, the date fruit can be stored at ambient temperature and dry conditions to extend the shelf life of the rutab-stage date fruits.

It is to be understood that the method for extending the rutab stage of the date palm fruit described herein is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

What is claimed:

1. A method for extending the rutab stage of date palm fruit, comprising:
    obtaining leaves from a date palm tree;
    obtaining date palm fruit at a rutab stage;
    drying the leaves for a period of time to obtain dried date palm leaves, reducing the dried date palm leaves to a powder;
    covering the rutab stage date fruit with the powder to obtain a powder-covered date fruit; and
    storing the powder-covered date fruit.

2. The method of claim 1, wherein the leaves are dried at a temperature of about 100° C.

3. The method of claim 1, wherein the leaves are dried in an oven.

4. The method of claim 1, wherein the period of time ranges from about 12 hours to about 36 hours.

5. The method of claim 1, wherein the period of time is about 24 hours.

6. The method of claim 1, the powder includes powder particles having a size ranging from about 300 micrometers to about 700 micrometers.

7. The method of claim 1, the powder includes powder particles having a size of about 500 micrometers.

8. The method of claim 1, wherein the powder-covered date fruit is stored at ambient temperature.

9. A method for extending the rutab stage of date palm fruit, comprising:
    obtaining leaves from a date palm tree;
    obtaining date fruit at a rutab stage;
    drying the leaves in an oven at a temperature ranging from about 90° C. to about 110° C. for a period of time to obtain dried date palm leaves;
    reducing the dried date palm leaves to a powder;
    covering the rutab stage date fruit with the powder to obtain a powder-covered date fruit; and
    storing the powder-covered date fruit.

10. The method of claim 9, wherein the leaves are dried at temperature of about 100° C.

11. The method of claim 9, wherein the time period is about 24 hours.

12. The method of claim 9, wherein the powder includes powder particles having a size ranging from about 300 micrometers to about 700 micrometers.

13. The method of claim 9, wherein the powder includes powder particles having a size of about 500 micrometers.

14. The method of claim 9, wherein the powder-covered date fruit is stored at ambient temperature.

15. A method for extending the rutab stage of date palm fruit, comprising:

obtaining leaves from a date palm tree;

obtaining date fruit at a rutab stage;

drying the leaves in an oven at a temperature ranging from about 90° C. to about 110° C. for about 12 hours to about 36 hours to obtain dried date palm leaves;

reducing the dried date palm leaves to a powder;

covering the rutab stage date fruit with the powder to obtain a powder-covered date fruit; and storing the powder-covered date fruit.

16. The method of claim 15, wherein the leaves are dried at a temperature of about 100° C.

17. The method of claim 15, wherein the leaves are dried for about 24 hours.

18. The method of claim 15, wherein the powder includes powder particles having a size of about 500 micrometers.

\* \* \* \* \*